3,219,499
COMPOSITION COMPRISING A HYDRAZINIUM POLYHYDRODODECABORATE AND A HYDRAZINIUM POLYHYDROBORATE
Boynton Graham, Wilmington, Del., assignor to E. I. du Pont de Nemours and Company, Wilmington, Del., a corporation of Delaware
No Drawing. Filed Feb. 18, 1964, Ser. No. 345,563
18 Claims. (Cl. 149—22)

This invention relates to compositions containing hydrazinium salts of at least two polyhydroborates and to their preparation. More specifically, this invention concerns compositions containing a hydrazinium polyhydrododecaborate and a hydrazinium salt of at least one other polyhydroborate.

Solutions of low molecular weight boron compounds in hydrazine are known to be useful as high energy fuels; however, improvement in the performance characteristics of these solutions is desirable to meet the changing demands for fuels in high energy applications. Boron compositions with improved properties are described in copending U.S. patent applications by R. K. Armstrong, Serial No. 193,651, now U.S. Patent No. 3,149,010; W. H. Knoth, Jr., Serial No. 193,654; and W. A. Jenkins, W. H. Knoth, Jr., H. S. Rothrock and R. A Smiley, Serial No 193,655, all filed May 7, 1962. These compositions are fluid mixtures of a hydrazine and one hydrazinium salt of the $B_{10}H_{10}^{-2}$, $B_{11}H_{14}^{-1}$ or $B_{12}H_{12}^{-2}$ anion. The fluid mixtures of these salts are more stable during storage and handling than previously known compositions; however, further improvements in properties of these mixtures are desirable, particularly in impact sensitivity, ease of ignition and sustained combustion.

It is an object of this invention to provide boron-containing compositions having the properties of ease of ignition, sustained combustion, and good impact sensitivity. It is another object to provide a method for preparing such boron-containing compounds. Still another object is the provision of compositions having a high energy content. These and other objects will become apparent hereinafter.

The compositions are characterized by two essential components, namely, a hydrazinium polyhydrododecaborate and a hydrazinium polyhydroborate which is separate and distinct from the polyhydrododecaborate.

The hydrazinium polyhydrododecaborate, employed as one component, is a compound of the formula $$(RR'NNH_3)_2B_{12}H_{12-n}X_n \quad (1)$$

where R and R' are hydrogen or lower alkyl groups (methyl, ethyl, butyl, and the like), X is a monovalent group capable of bonding to carbon of a benzene nucleus by replacement of hydrogen bonded to said carbon; and $n$ is a cardinal whole number of at most 3, i.e., $n$ is 0, 1, 2 or 3.

The hydrazinium polyhydroborate, employed as the second component is a compound selected from $$(RR'NNH_3)_aB_yH_z \quad (2a)$$

and $$(RR'NNH_3)_2B_{10}H_{10-n}X_n \quad (2b)$$

where R, R', X and $n$ are defined as in Formula 1, $y$ and $z$ each are different positive whole numbers of 1 to 20, inclusive, i.e., $y$ and $z$ cannot both be the same whole number; and $a$ is a positive whole number which is equal to the valence or ionic charge on $B_yH_z$. The valence of the anion is at least one and generally does not exceed 4; the value for $a$, therefore, generally lies between 1 and 4, inclusive. Compounds of Formulas 2a and 2b will be referred to hereinafter collectively as Formula 2 and such reference, therefore, includes 2a and 2b.

X, in the above formulas, is a monovalent group which has the characterizing property of forming X=C bonds where C represents a carbon which is a nuclear member of a benzene ring and where the X=C bond is formed in place of an H—C bond. The property of forming X—C bonds, where C is nuclear carbon as defined above, is common to all the groups which are represented by X.

X, in the above formulas, can be introduced into the boron compound by direct reaction, or it can represent a substituent obtained by subsequent chemical modification of a group already introduced, e.g., a substituent obtained by reduction, esterification, hydrolysis or amidation of directly introduced groups.

Examples of X substituents which are included within the scope of X, in the above formulas, are as follows: halogens (F, Cl, Br, I), hydrocarbon, carboxyl $$(-\overset{O}{\underset{\|}{C}}-OH)$$

carbamyl and N-substituted carbamyl $$(-\overset{O}{\underset{\|}{C}}-NH_2, -\overset{O}{\underset{\|}{C}}-NHR', -\overset{O}{\underset{\|}{C}}-NR_2')$$

halocarbonyl $$(-\overset{O}{\underset{\|}{C}}-Y, \text{ where Y is F, Cl, Br, I})$$

halomethyl (—$CH_2Y'$, where Y' is F, Cl, Br, I), hydroxy (—OH), hydrocarbonoxy (—OR'), monooxahydrocarbonoxy (R'OR'O—), acetal [—CH(OR')$_2$], ketal [—CR'(OR')$_2$], hydrocarboncarbonyloxy [—OC(O)R'], hydrocarbonoxycarbonyl [—C(O)OR'], isocyanate (—NCO)

thiocyanate (—CNS), isothiocyanate (—NCS), hydrocarbonmercapto (—SR'), hydroxymethyl (—$CH_2OH$), hydrocarbonoxymethyl (—$CH_2OR'$), aminomethyl (—$CH_2NH_2$, —$CH_2NHR'$, —$CH'NR'_2$)

cyano (—CN), amino (—$NH_2$), substituted amino (—NHR', —$NR_2'$)

acyl $$(-\overset{O}{\underset{\|}{C}}-R)$$

formyl $$(-\overset{O}{\underset{\|}{C}}-H)$$

nitro (—$NO_2$), nitroso (—NO), azo (—N=N—Ar, where Ar is aromatic hydrocarbon of up to 10 carbons), sulfo (—$SO_3H$), sulfonyl (—$SO_2R'$), and acetoxymercury (—$HgOCCH_3$); R', where used in the above substituents, is a monovalent organic group which is preferably a hydrocarbon group (alkyl, cycloalkyl, alkenyl, cycloalkenyl, aryl, alkaryl, aralkyl, and the like) of at most 18 carbons, and azido.

Preferably X is hydroxyl (—OH), amino (—$NH_2$) or azido (—$N_3$).

Representative examples of compounds of Formula 1 include
($NH_2NH_3$)$_2B_{12}H_{12}$,
[($CH_3$)$_2NNH_3$]$_2B_{12}H_{12}$,
[($C_2H_5$)$_2NNH_3$]$_2B_{12}H_{12}$,
[($C_3H_7$)$_2NNH_3$]$_2B_{12}H_{12}$,
($CH_3NHNH_3$)$_2B_{12}H_{12}$,
($NH_2NH_3$)$_2B_{12}H_{11}OH$,
($NH_2NH_3$)$_2B_{12}H_{10}(OH)_2$,
[($CH_3$)$_2NNH_3$]$_2B_{12}H_{11}NH_2$,
($NH_2NH_3$)$_2B_{12}H_{10}(NH_2)_2$,
($NH_2NH_3$)$_2B_{12}H_{11}N_3$,
[($CH_3$)$_2NNH_3$]$_2B_{12}H_{11}N_3$, $(NH_2NH_3)_2B_{12}H_{11}COOH$,
$[(CH_3)_2NNH_3]_2B_{12}H_{10}Cl_2$,
$[(CH_3)_2NNH_3]_2B_{12}H_9Cl_3$,
$[(C_2H_5)_2NNH_3]_2B_{12}H_{11}C_2H_5$, $(NH_2NH_3)_2B_{12}H_{11}\overset{O}{\overset{\|}{C}}OCH_3$, $(CH_3NHNH_3)_2B_{12}H_{11}\overset{O}{\overset{\|}{C}}NH_2$, $[(CH_3)_2NNH_3]_2B_{12}H_{11}\overset{O}{\overset{\|}{C}}NHCH_3$, $(NH_2NH_3)_2B_{12}H_{10}(\overset{O}{\overset{\|}{C}}NH_2)_2$, $(NH_2NH_3)_2B_{12}H_{11}\overset{O}{\overset{\|}{C}}N(C_2H_5)_2$,
$[(CH_3)_2NNH_3]_2B_{12}H_{10}(CN)_2$,
$[(C_3H_7)_2NNH_3]_2B_{12}H_{11}CF_3$,
$(NH_2NH_3)_2B_{12}H_9F_3$,
$(NH_2NH_3)_2B_{12}H_{10}(SO_3H)_2$, $(NH_2NH_3)_2B_{12}H_{11}HgO\overset{O}{\overset{\|}{C}}CH_3$, $[(CH_3)_2NNH_3]_2B_{12}H_{11}C(CN)=C(CN)_2$,
$(NH_2NH_3)_2HB_{12}H_{10}(C_6H_5)_2$,
$(C_4H_9NHNH_3)_2B_{12}H_{11}SO_2NH_2$,
$(NH_2NH_3)_2B_{12}H_{10}F_2$,
$(NH_2NH_3)_2B_{12}H_{11}SO_2C_6H_5$,
$[(CH_3)_2NNH_3]_2B_{12}H_9(NO_2)_3$,
$[(C_2H_5)_2NNH_3]_2B_{12}H_{11}N(CH_3)_2$, $[(CH_3)_2NNH_3]_2B_{12}H_{11}\overset{O}{\overset{\|}{C}}C_6H_5$, $(NH_2NH_3)_2B_{12}H_{10}(O\overset{O}{\overset{\|}{C}}CH_3)_2$, $[(CH_3)_2NNH_3]_2B_{12}H_{10}(OC_4H_9)_2$,
$(NH_2NH_3)_2B_{12}H_{10}(SCH_2C_6H_5)_2$,
and $[(CH_3)_2NNH_3]_2B_{12}H_{11}OCH_2CH_2OCH_3$.

The invention includes within its scope compounds with two or more X groups which are unlike, e.g., $(H_2NH_3)_2B_{12}H_9(SCH_3)_2(OC_2H_5)$,
$[(CH_3)_2NNH_3]_2B_{12}H_{10}ClC_2H_5$,
and $[(C_2H_5)_2NNH_3]_2B_{12}H_{10}(C_2H_5)(OCH_2CH_2OCH_3)$,
and the like.

Representative examples of the compounds of Formula 2 are the hydrazinium salts of the anions $BH_4^{-1}$, $B_3H_8^{-1}$, $B_{10}H_{10}^{-2}$, $B_{11}H_{14}^{-1}$, $B_{20}H_{18}^{-2}$, $B_{20}H_{19}^{-3}$ and $B_{20}H_{18}^{-4}$. Further and more specific illustrations of hydrazinium salts of Formula 2 are $NH_2NH_3BH_4$ (in hydrazine solution),
$NH_2NH_3B_{11}H_{14}$,
$(CH_3)_2NNH_3B_{11}H_{14}$,
$(CH_3NHNH_3)_2B_{10}H_{10}$,
$(NH_2NH_3)_2B_{10}H_9OH$,
$(NH_2NH_3)_2B_{10}H_8(OH)_2$,
$[(C_2H_5)_2NNH_3]_2B_{10}H_9NH_2$,
$(NH_2NH_3)_2B_{10}H_8(NH_2)_2$,
$[(CH_3)_2NNH_3]_2B_{10}H_9N_3$,
$(NH_2NH_3)_2B_{10}H_9N_3$,
$(NH_2NH_3)_4B_{20}H_{18}$,
$[(CH_3)_2NNH_3]_2B_{10}H_9OCH_3$,
$(NH_2NH_3)_2B_{10}H_9COOH$,
$[(CH_3)_2N-NH_3]_2B_{10}H_8Cl_2$,
$(NH_2NH_3)_2B_{10}H_8(CH_3)_2$, $[(CH_3)_2NNH_3]_2B_{10}H_9\overset{O}{\overset{\|}{C}}OCH_3$, $(CH_3NHNH_3)_2B_{10}H_9\overset{O}{\overset{\|}{C}}NH_2$, $(NH_2NH_3)_2B_{10}H_9\overset{O}{\overset{\|}{C}}NHCH_3$, $[(CH_3)_2NNH_3]_2B_{10}H_9\overset{O}{\overset{\|}{C}}N(C_2H_5)_2$,
$[(C_2H_5)_2NNH_3]_2B_{10}H_8(CN)_2$,
$[(C_3H_7)_2NNH_3]_2B_{10}H_7Cl_3$,
$(NH_2NH_3)_2B_{10}H_8(SO_3H)_2$, $[(CH_3)_2NNH_3]_2B_{10}H_9HgO\overset{O}{\overset{\|}{C}}CH_3$, $(NH_2NH_3)_2B_{10}H_9C(CN)=C(CN)_2$,
$[(CH_3)_2NNH_3]_2B_{10}H_9SO_2NH_2$,
$(NH_2NH_3)_2B_{10}H_8F_2$,
$[(CH_3)_2NNH_3]_2B_{10}H_9SO_2C_6H_5$,
$(NH_2NH_3)_2B_{10}H_7(NO_2)_3$,
$(CH_3NHNH_3)_2B_{10}H_9N(CH_3)_2$, $[(CH_3)_2NNH_3]_2B_{10}H_9\overset{O}{\overset{\|}{C}}CH_3$, $(CH_3NHNH_3)_2B_{10}H_7I_3$,
and $(NH_2NH_3)_2B_{10}H_8[OC(O)CH_3]_2$.

Preferably the compounds of Formula 1 are the unsubstituted dodecaborates, i.e., compounds of the formula $(RR'NH_3)_2B_{12}H_{12}$, and the preferred compounds of Formula 2 are the hydrazinium salts of the $B_{10}H_{10}^{-2}$ anion and $B_{11}H_{14}^{-1}$ anion, i.e., compounds of the formulas $(RR'NNH_3)_2B_{10}H_{10}$ and $RR'NNH_3B_{11}H_{14}$. These compounds are stable white crystalline salts.

The compositions of this invention can be solid or fluid. Solid compositions are physical mixtures of hydrazinium dodecaborates of Formula 1 with hydrazinium polyhydroborates of Formula 2 which are stable at atmospheric temperature. Representative illustrations of solid compositions are mixtures of $(NH_2NH_3)_2B_{12}H_{12}$ with $(NH_2NH_3)_2B_{10}H_{10}$ and $NH_2NH_3B_{11}H_{14}$, $[(CH_3)_2NNH_3]_2B_{12}H_{12}$ with $(NH_2NH_3)_2B_{10}H_{10}$ or $(CH_3)_2NNH_3B_{11}H_{14}$, and the like.

Fluid compositions are fluid mixtures or solutions of the compounds of Formulas 1 and 2 with a hydrazine of the formula $RR'NNH_2$ (where R and R' are hydrogen or lower alkyl). These fluid compositions are a preferred group. Stability of the solid crystalline salts at atmospheric temperature is not necessary for fluid compositions.

For optimum ignition and combustion performance, it is preferred to employ the components (the hydrazinium salts of Formulas 1 and 2 and, optionally a hydrazine) in such proportions that the ratio of atoms of boron to atoms of nitrogen in the solid or fluid mixture is at least 0.15 and at most 5. An especially preferred ratio of atoms of boron to atoms of nitrogen lies between 0.4 and 1.0. Fluid mixtures employing hydrazine and polyhydropolyborates in quantities to provide these ratios possess physical properties which permit easy handling and which may, if not sufficiently fluid, be converted to free flowing liquids by the addition of a minor quantity of water, liquid HCN or other solvent.

It is further preferred, for optimum combination of stability and combustion properties, that the weight of the $B_{12}$ component (calculated as the free acid, e.g., $H_2B_{12}H_{12}$) is not less than 25% and not more than 90% of the total weight of polyhydropolyborates in the composition (expressed as acids of polyhydropolyborates, e.g., $H_2B_{10}H_{10}$ and $HB_{11}H_{14}$); in the most preferred compositions, the weight of the $B_{12}$ component (again expressed as the free acid) is from 40 to 60%, inclusive, of the total weight of polyhydropolyborates.

In summary, the preferred compositions of the invention contain polyhydropolyborates of Formulas 1 and 2 in which the quantity of $B_{12}$ component (expressed as the acid, e.g., $H_2B_{12}H_{12}$) is from 25–90% of the total weight of the boron-containing components (expressed as the free acids of the polyhydropolyborate anions) and the ratio of total atoms of boron to total atoms of nitrogen (B/N) in the compositions lies between 0.15 and 5, inclusive. Especially preferred compositions contain polyhydropolyborates of Formulas 1 and 2 in which the weight of the $B_{12}$ component is from 40–60% of the total weight of the boron-containing components (the percent of each such component being expressed as the free acid of the polyhydropolyborate anion), and the ratio of total atoms of boron to total atoms of nitrogen lies between 0.4 and 1.0, inclusive.

From the foregoing, it is evident that the characterizing components of the compositions of the invention are a hydrazinium polyhydrododecaborate, a hydrazinium salt of at least one other polyhydroborate and, optionally a hydrazine. These components constitute the principal portion of the compositions, i.e., at least 80% by weight (and preferably 90% by weight) of the total composition. Minor amounts of other materials can be present, in particular, components which function as freezing point depressants, e.g., water, hydrogen sulfide, hydrogen cyanide, and the like. These latter materials however, do not constitute novel and characterizing features of the compositions of the invention.

The compositions have excellent resistance against explosive decomposition by sudden mechanical shock. They are hypergolic with concentrated nitric acid and, following ignition with catalytic amounts of this acid, the compositions burn steadily and vigorously. The compositons possess a combination of properties not previously available in other compositions, namely, excellent impact stability, ease of ignition, sustained combustion and a controllable but rapid release of energy, and thus possess obvious advantages in the field of high energy fuels.

As a further advantage, the compositions have a high boron content. The hydrazinium salts of polyhydrododecaborates usually contain 60% by weight or more of boron. In contrast, a hydrazinium salt of a lower hydroborate, e.g., a hydrazinium salt of the $BH_4^{-1}$ anion, contains only from about 20–25% of boron.

The compositions are solids, semi-solids or liquids at normal atmospheric temperatures and can be stored in conventional containers open to the air with no signs of decomposition. Compositions which contain 50% or more by weight of the salts in a substantially pure hydrazine may form deposits on cooling or exist as dispersions at atmospheric temperatures. Small amounts of water or other solvents may be added to these compositions to form clear solutions or they may be heated to dissolve suspended material.

The compositions of the invention are prepared most conveniently by simple mixing of the hydrazinium salts or hydrazine solutions of the salts. Solutions of the higher polyhydropolyborates are also easily prepared by dissolving the solid hydrazinium polyhydropolyborates in a hydrazine, employing the calculated quantities of each component necessary to obtain a solution of the desired composition. Processes for preparing hydrazine solutions of hydrazinium salts of higher polyhydropolyborates, i.e., hydrazine solutions containing the $B_{12}H_{12}^{-2}$, $B_{10}H_{10}^{-2}$ or $B_{11}H_{14}^{-1}$ anions are described in copending applications to which reference was made earlier and are also described in examples which illustrate the invention.

Another procedure which is satisfactory, particularly for solutions having $B_{12}H_{12}^{-2}$ and $B_{10}H_{10}^{-2}$ anions, consists in dissolving the acids (generally as hydrates) of $B_{12}H_{12}^{-2}$ and $B_{10}H_{10}^{-2}$ anions, i.e., $H_2B_{12}H_{12}$ and $H_2B_{10}H_{10}$ and their hydrates, in a hydrazine. The hydrazinium salts are thus formed directly in solution. Hydrates of the acids used in this method may contain up to 16 or more molecules of water. This procedure is not suitable for hydrazinium salts of the $B_{11}H_{14}^{-1}$ anion for reasons which are given later.

In the above processes, solution of the components is accomplished by simple stirring of the mixtures, employing heating when necessary to expedite the process. Temperatures up to 100° C. or higher can be used.

A further procedure, which is operable with higher polyhydropolyborates, consists in dissolving ammonium or substituted ammonium salts (from primary, secondary and tertiary amines) of the polyborate anions in a hydrazine and warming the mixture, or holding it at ambient temperature, until ammonia ($NH_3$) or the amine is volatilized from the mixture. To illustrate, $(NH_4)_2B_{12}H_{12}$ and one or both of $(NH_4)_2B_{10}H_{10}$ and $NH_4B_{11}H_{14}$ can be dissolved in calculated quantities in a hydrazine and the solution can be heated until all the ammonia has been expelled. Similarly, $[(C_2H_5)_3NH]_2B_{12}H_{12}$ and one or both of $[(CH_3)_3NH]_2B_{10}H_{10}$ and $CH_3NHB_{11}H_{14}$ can be dissolved in a hydrazine and warmed until all of the $(C_2H_5)_3N$ and $(CH_3)_3N$ are expelled.

Hydrazines which are employed as one reactant in the process are well-known compounds of the formula $RR'NNH_2$, as described earlier. The simplest hydrazine, i.e., $NH_2NH_2$, is preferred because of cost, availability and energy potential. The hydrazines need not be anhydrous and usually they can be employed as purchased in 90% or higher purity. The hydrazine employed to prepare the hydrazinium salts is not necessarily the same hydrazine which can be employed in the event the final composition is a solution. To illustrate, $(NH_2NH_2)_2B_{12}H_{12}$ and $(CH_3NHNH_2)_2B_{10}H_{10}$ can be dissolved in $(CH_3)_2NNH_2$.

The acids and hydrazinium salts of the polyhydropolyborates are not generally available products. The acids, $H_2B_{12}H_{12}$ and $H_2B_{10}H_{10}$, and hydrates of these acids are readily obtained by contacting a solution of a salt of the appropriate polyhydropolyborate with an acidic ion-exchange resin. These resins are available commercially. To illustrate, aqueous solutions of $Na_2B_{12}H_{12}$ or of $(NH_4)_2B_{10}H_{10}$ can be contacted with a commercial acid ion-exchange resin of the crosslinked polystyrene-sulfonic acid type and the aqueous solutions of the acids can be evaporated until crystals of the hydrated acids are obtained. Optionally, the aqueous solutions of the acids can be neutralized with a hydrazine and evaporated to the point where the hydrazinium salts crystallize.

The acid of the $B_{11}H_{14}^{-1}$ anion is unstable and hydrazinium salts of this anion are obtained most satisfactorily by reaction of an ammonium or substituted ammonium salt of the $B_{11}H_{14}^{-1}$ anion with a hydrazine.

The compositions of the invention and their preparation are illustrated further in the examples which follow. Typical compositions are illustrated in Tables I and II, and the preparation of the components employed in their preparation is described in Examples A through C.

*Example A*

This example illustrates the preparation of reactants containing the $B_{10}H_{10}^{-2}$ anion.

(1) $(NH_4)_2B_{10}H_{10}$.—A reaction vessel having a capacity of about 365 parts of water is charged with 0.79 part of decaborane(14), cooled in liquid nitrogen, and then evacuated to a pressure of 10 microns of mercury. Approximately 21 parts of methyl sulfide is condensed onto the decaborane(14) in the reaction vessel. The reaction vessel is closed, allowed to warm to room temperature (about 25° C.) and stand for 4 days. Hydrogen is evolved during this period. The reaction vessel is opened and excess methyl sulfide is removed by distillation, leaving a practically quantitative yield of a white solid residue of bis(dimethylsulfide)decaborane(12) of the formula

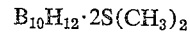
$$B_{10}H_{12} \cdot 2S(CH_3)_2$$

The compound is recrystallized from ethyl acetate and it melts at 122–124° C.

The bis(dimethylsulfide)decaborane(12) (8.5 parts) is mixed with 40–45 parts of liquid ammonia and stirred in a round-bottom reaction vessel for 1 hour with the vessel being cooled to about −50° C. by partial immersion in a mixture of solid carbon dioxide and acetone. The cooling bath is then removed and the excess ammonia is allowed to evaporate with stirring. The remaining traces of ammonia are removed by subjecting the residue to a high vacuum (0.01 mm. of mercury) at 25° C. There is obtained 5.6 parts of solid residue which is virtually a quantitative yield of diammonium decahydrodecaborate(2−), i.e., $(NH_4)_2B_{10}H_{10}$.

(2) $(RR'NNH_3)_2B_{10}H_{10}$.—The salt, $(NH_4)_2B_{10}H_{10}$, is dissolved in water and the aqueous solution passed through a column filled with a commercial acid ion-exchange resin of the polystyrene-sulfonic acid class. The aqueous effluent is collected and hydrazine hydrate is added to it with stirring in sufficient quantity to make the solution basic. The solution is evaporated under reduced pressure until a semi-solid mass forms. The semi-solid residue is crystallized from water to obtain pure white crystals of dihydrazinium decahydrodecaborate(2−) containing one mole of hydrazine as solvent of crystallization.

Alternatively, approximately equal parts by weight of $(NH_4)_2B_{10}H_{10}$ and hydrazine (95+% purity) can be mixed with stirring. Ammonia is evolved and a dispersion of approximately 60% by weight of $$(NH_2NH_3)_2B_{10}H_{10}$$

in hydrazine is obtained. This composition can be diluted with hydrazine to obtain solutions with a lower concentration of hydrazinium decahydrodecaborate. The solution can be heated to remove part of the hydrazine to obtain a dispersion having a higher concentration of hydrazinium salt.

Similarly, a mixture of about 1.0 part of $(NH_4)_2B_{10}H_{10}$ and 2 parts of 1,1-dimethylhydrazine can be stirred and heated for 10 minutes at steam bath temperature (95–100° C.). Ammonia is released in the process and a clear solution of bis(1,1-dimethylhydrazinium) decahydrodecaborate(2−) in 1,1-dimethylhydrazine is obtained. The solution is evaporated to obtain $$[(CH_3)_2N_2H_3]_2B_{10}H_{10}$$

as a white crystalline hygroscopic solid. The hydrazinium salt may be dissolved in a hydrazine to form solutions of the desired concentration.

(3) $H_2B_{10}H_{10}$.—The salt, $(NH_4)_2B_{10}H_{10}$, is dissolved in water and the aqueous solution is passed through a column filled with a commercial acid ion-exchange resin of the crosslinked polystyrene-sulfonic acid class. The aqueous effluent is collected and evaporated slowly at moderate temperatures until crystals form. The concentrated solution is now cooled and the crystals of hydrated $H_2B_{10}H_{10}$ are separated by filtration. The acid thus obtained is used for preparing compositions of the invention by the procedure described earlier.

*Example B*

This example illustrates the preparation of reactants containing the $B_{11}H_{14}^{-1}$ anion.

(1) $(CH_3)_3NHB_{11}H_{14}$.—A 500 ml. 3-necked glass vessel is fitted with a dropping funnel, a stirrer and a condenser placed so that condensed vapors are returned to the flask. The flask is charged with 0.95 g. of $NaBH_4$ (.025 mole) and flushed with nitrogen. An atmosphere of nitrogen is maintained in the flask throughout the process. Dry dioxane (100 ml.) is introduced into the flask. The mixture is stirred and a solution of 3.80 g. of $B_{10}H_{14}$ (0.035 mole) in 100 ml. of dry dioxane is added dropwise to the reaction mixture. A yellow solid forms and this is accompanied by the evolution of hydrogen. The flask is heated to the boiling point of the dioxane (100° C.) and the reaction mixture is refluxed for a total of 16 hours at the end of which time evolution of hydrogen has stopped completely. The reaction mixture is cooled and filtered in a stream of nitrogen. The yellow solid which precipitates is separated and vacuum-dried at 40° C. under ca. 1 mm. of mercury pressure. There is obtained 7.36 g. of $NaB_{11}H_{14} \cdot 2.5C_4H_8O_2$, a compound which is sodium tetradecahydroundecaborate(1−) having 2.5 molecules of dioxane of crystallization.

A solution is prepared consisting of 100 ml. of water and 40 g. of $NaB_{11}H_{14} \cdot 2.5C_4H_8O_2$. A second solution is prepared consisting of 25 ml. of water and 10 g. of $$(CH_3)_3NHCl$$

The two solutions are mixed in a glass reaction vessel and stirred for a short time. The yellow precipitate which forms is separated, dried 3 hours in air and then dried overnight under low pressure. The product, which is $(CH_3)_3NHB_{11}H_{14}$, is obtained in 70–73% yield.

(2) $RR'NNH_3B_{11}H_{14}$.—A mixture is prepared consisting of 0.64 part of $(CH_3)_3NHB_{11}H_{14}$ and 1 part of hydrazine (95+% purity). The mixture is stirred and trimethylamine is liberated. A suspension of $$NH_2NH_3B_{11}H_{14}$$

in hydrazine is formed which contains about 37% by weight of the hydrazinium salt. The composition is heated for 2 hours at steam bath temperatures (95–100° C.) in air without evidence of decomposition. The product can be warmed under reduced pressure for a short time to remove some of the hydrazine and thus obtain suspensions having a higher concentration of $NH_2NH_3B_{11}H_{14}$, or it can be heated for a sufficient time to remove all of the hydrazine. A white solid remains which is hydrazinium tetradecahydroundecaborate(1−) containing about 4 molecules of hydrazine of crystallization, i.e., $$NH_2NH_3B_{11}H_{14} \cdot 4NH_2NH_2$$

This hydrazinium salt can be dissolved in a hydrazine in the amount needed to obtain a solution having the desired concentration.

*Example C*

This example illustrates the preparation of reactants containing the $B_{12}H_{12}^{-2}$ anion.

(1) $[(C_2H_5)_3NH]_2B_{12}H_{12}$.—A glass vessel is employed which is fitted with a stirrer, a thermometer and a reflux condenser which is also connected to a wet test meter. The vessel is charged with 200 ml. of triethylamine-borane adduct $[(C_2H_5)_3N—BH_3]$, prepared as described in U.S. 2,860,167. Nitrogen gas is passed into the vessel and the reaction mass is heated to 170–175° C. A solution of 29 g. of $B_{10}H_{14}$ in 100 ml. of $(C_2H_5)_3N—BH_3$ is added to the reaction mass over a period of about 1 hour with vigorous stirring. After addition is complete, the reaction mixture is stirred 15 minutes maintaining the temperature at 170–175° C. Hydrogen gas is evolved at a rate which decreases sharply during the final stirring. The reaction mass is cooled to about 25° C. to form a mixture of white solid and pale yellow liquid. The solid is separated by filtration, washed with ether and dried. There is obtained 69 g. of $[(C_2H_5)_3NH]_2B_{12}H_{12}$.

(2) $H_2B_{12}H_{12}$ and $(NH_4)_2B_{12}H_{12}$.—A portion of the above-prepared product is dissolved in water and the aqueous solution is passed through a column filled with a commercial acid ion-exchange resin of a cross-linked polystyrenesulfonic acid type. The aqueous effluent is a solution of $H_2B_{12}H_{12}$ from which the free acid is obtained in solid form as a hydrate by evaporation of the solution. The crystalline acid may contain up to 16 or more molecules of water of hydration. Its exact composition is easily determined by conventional analytical procedures, e.g., titration of samples of known weight. The solution can be neutralized with a base, e.g., $NH_4OH$, to $(NH_4)_2B_{12}H_{12}$. The salt is isolated by evaporation of the solution to dryness.

(3) $(RR'NNH_3)_2B_{12}H_{12}$.—A portion of the aqueous effluent containing $H_2B_{12}H_{12}$ is neutralized with hydrazine hydrate to a pH of 7. The neutral solution is evaporated to leave $(NH_2NH_3)_2B_{12}H_{12}$ as a white crystalline solid. A solution of this salt in hydrazine is prepared in the ratio of 0.7 part of the salt to 2 parts of hydrazine (95+%). The solution is clear and it is heated for 10 minutes at steam bath temperatures (95–98° C.) with no evidence of decomposition.

Alternatively, a mixture can be prepared consisting of 1 part of $(NH_4)_2B_{12}H_{12}$ and about 2.5 parts of 1,1-dimethylhydrazine. The mixture is heated at steam bath temperatures for 30 minutes. Ammonia is released as a gas and a suspension containing about 45% by weight of $[(CH_3)_2NNH_3]_2B_{12}H_{12}$ in $(CH_3)_2NNH_2$ is obtained. The bis(1,1-dimethylhydrazinium) dodecahydrodecaborate(2−) is isolated, if desired, by evaporation of the solution at atomspheric pressure. The compound, which is a white crystalline solid, is recrystallized from water. It is obtained with 1 mole of $(CH_3)_2NNH_2$ as solvent of crystallization, i.e., a compound of the formula

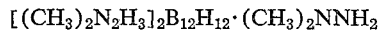

$$[(CH_3)_2N_2H_3]_2B_{12}H_{12} \cdot (CH_3)_2NNH_2$$

Additionally, a hydrate of $H_2B_{12}H_{12}$ can be dissolved in a small excess of hydrazine hydrate. The solution is cooled and a crystalline salt separates. The crystals are isolated and purified by crystallization from water and have the formula $(NH_2NH_3)_2B_{12}H_{12} \cdot 2NH_2NH_2$.

Table I illustrates representative compositions containing $B_{12}H_{12}^{-2}$ and $B_{10}H_{10}^{-2}$ anions that are within the scope of the invention. Table II illustrates representative compositions of the invention that are mixtures of $B_{12}H_{12}^{-2}$ and $B_{11}H_{14}^{-1}$ anions.

the desired ratio of boron atoms to nitrogen atoms and $B_{12}H_{12}^{-2}$ content.

Examples 1–4, which are given below, illustrate further the compositions and their superior ignition properties. The ignition performance of the compositions is determined in a test chamber which is open at one end and which contains a small quantity of the composition to be tested. A catalytic amount of concentrated nitric acid is added to the test chamber in such a manner that it flows down the wall of the chamber and comes into contact with the hydrazine composition containing the polyhydropolyborates. The test is conducted at atmospheric pressure and prevailing atmospheric temperature. The ignition and burning properties of each composition are observed and a qualitative estimate of the properties is made.

Example 1

A saturated solution of $(NH_2NH_3)_2B_{10}H_{10}$ in hydrazine (29 g. of $H_2B_{10}H_{10}$/100 g. solution, density 1.0508) is mixed with an equal volume of a saturated solution of $(NH_2NH_3)_2B_{12}H_{12}$ in hydrazine (24 g. $H_2B_{12}H_{12}$/100 g. solution, density 1.0417). The solution thus obtained contains $B_{12}H_{12}^{-2}$ and $B_{10}H_{10}^{-2}$ anions in approximately 45:55 ratio (calculated as $H_2B_{12}H_{12}$ and $H_2B_{10}H_{10}$). A portion of this mixture is ignited by injecting into it about 10% by volume of concentrated nitric acid (den-

TABLE I

| Parts by weight of— | | | Weight ratio, percent $B_{12}H_{12}^{-2}$/percent $B_{10}H_{10}^{-2}$ (Calculated as the acids) | B/N ratio | Physical properties of mixture |
|---|---|---|---|---|---|
| $(N_2H_5)_2B_{12}H_{12}$ | $(N_2H_5)_2B_{10}H_{10}$ | $N_2H_4$ | | | |
| 3 | 12 | 85 | 25/75 | 0.15 | Fluid. |
| 10 | 32 | 58 | 25/75 | 0.51 | Do. |
| 16 | 49 | 35 | 25/75 | 1.00 | Semi-solid. |
| 24 | 76 | 0 | 25/75 | 2.61 | Dry mixture. |
| 7 | 8 | 85 | 50/50 | 0.15 | Fluid. |
| 19 | 20 | 61 | 50/50 | 0.48 | Do. |
| 31 | 33 | 36 | 50/50 | 1.00 | Semi-solid. |
| 48 | 52 | 0 | 50/50 | 2.74 | Dry mixture. |
| 11 | 4 | 85 | 75/25 | 0.15 | Fluid. |
| 27 | 10 | 63 | 75/25 | 0.45 | Do. |
| 47 | 16 | 37 | 75/25 | 1.00 | Semi-solid. |
| 74 | 26 | 0 | 75/25 | 2.88 | Dry mixture. |

TABLE II

| Parts by weight of— | | | Weight ratio, percent $B_{12}H_{12}^{-2}$/percent $B_{11}H_{14}^{-1}$ (Calculated as the acids) | B/N ratio | Physical properties of mixture |
|---|---|---|---|---|---|
| $(N_2H_5)_2B_{12}H_{12}$ | $(N_2H_5)_2B_{11}H_{14}$ | $N_2H_4$ | | | |
| 4 | 10 | 86 | 25/75 | 0.15 | Fluid. |
| 10 | 25 | 65 | 25/75 | 0.48 | Do. |
| 16 | 40 | 44 | 25/75 | 1.00 | Semi-solid. |
| 28 | 72 | 0 | 25/75 | 4.54 | Solid. |
| 7 | 6 | 87 | 50/50 | 0.15 | Fluid. |
| 19 | 16 | 65 | 50/50 | 0.46 | Do. |
| 31 | 27 | 42 | 50/50 | 1.00 | Semi-solid. |
| 54 | 46 | 0 | 50/50 | 3.90 | Solid. |
| 13.4 | 1.3 | 85.3 | 90/10 | 0.15 | Fluid. |
| 32 | 3 | 65 | 90/10 | 0.42 | Do. |
| 57 | 5 | 38 | 90/10 | 1.00 | Semi-solid. |
| 91 | 9 | 0 | 90/10 | 3.08 | Solid. |

In any of the above compositions, N,N-lower alkyl substituted hydrazines can be employed in place of $NH_2NH_2$. To illustrate, substituted hydrazines which may be used are $(CH_3)_2NNH_2$, $CH_3NHNH_2$,

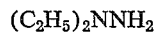

$$(C_2H_5)_2NNH_2$$

$C_2H_5NHNH_2$, $(C_3H_7)_2NNH_2$, $C_3H_7NHNH_2$, and the like.

Mixtures of $(NH_2NH_3)_2B_{10}H_{10}$ and $NH_2NH_3B_{11}H_{14}$ can be employed with $(NH_2NH_3)_2B_{12}H_{12}$, using appropriate quantities to provide compositions having the B/N ratios and $B_{12}H_{12}^{-2}$ contents illustrated in Tables I and II.

The illustrations in Tables I and II are not limiting and are presented to show the wide range of quantities of hydrazinium salts and, optionally, hydrazine, which can be employed to obtain compositions which have sity, 1.5). The quantity of nitric acid which is used represents about 0.1 equivalent of oxidizing potential and the acid is, therefore, used in only catalytic amount.

The mixture ignites readily. Combustion is smooth, sustained and vigorous. The duration of burning is about 6–13 seconds/gram of solution.

Example 2

One part by volume of a saturated solution of $(NH_2NH_3)_2B_{10}H_{10}$ in hydrazine is mixed with 3 parts by volume of a saturated solution of $(NH_2NH_3)_2B_{12}H_{12}$ in hydrazine. The solution thus obtained contains $B_{12}H_{12}^{-2}$ and $B_{10}H_{10}^{-2}$ anions in about 72:28 ratio (calculated as the acids). Nitric acid is injected into a portion of this solution as described in Example 1. The solution ignites readily and burns in a smooth, sustained and vigorous manner.

Example 3

A. One part by volume of a saturated solution of $NH_2NH_3B_{11}H_{14}$ (28 g. $HB_{11}H_{14}$/100 g. of solution, density 1.02) is mixed with 9 volumes of a saturated solution of $(NH_2NH_3)_2B_{12}H_{12}$ in hydrazine. The solution thus obtained contains $B_{12}H_{12}^{-2}$ and $B_{11}H_{14}^{-1}$ anions in about 89:11 ratio (calculated as the acids). Concentrated nitric acid is injected into the mixture as described in Example 1. The solution ignites readily and burns in a smooth, sustained and vigorous manner.

B. A mixed solution is prepared which consists of 25 parts by volume of a saturated solution of $NH_2NH_3B_{11}H_{14}$ in 75 parts by volume of a saturated solution of $(NH_2NH_3)_2B_{12}H_{12}$ in hydrazine. The solution thus obtained contains $B_{12}H_{12}^{-2}$ and $B_{11}H_{14}^{-1}$ anions in about 73:27 ratio (calculated as the acids). The mixed solution is ignited with concentrated nitric acid and burns readily in a smooth sustained manner.

C. A mixed solution is prepared which consists of 15 parts of a saturated solution of $NH_2NH_3B_{11}H_{14}$ in hydrazine and 85 parts of a saturated solution of $(NH_2NH_3)_2B_{12}H_{12}$ in hydrazine. The solution thus obtained contains $B_{12}H_{12}^{-2}$ and $B_{11}H_{14}^{-1}$ anions in about 83:17 ratio (calculated as the acids). The mixed solution ignites readily when injected with concentrated nitric acid, as described in Example 1 and burns in a smooth sustained manner.

Example 4

A solution of hydrazinium tetrahydroborate (29% by weight) in hydrazine is prepared by the procedure described in U.S. 3,000,712. A portion (74 parts by weight) of this solution is mixed with 25 parts of a saturated solution of dihydrazinium dodecahydrododecaborate(2—) at prevailing atmospheric temperature (ca. 25° C.). The homogeneous mixture consists of 13% by weight of $BH_4^{-1}$ and $B_{12}H_{12}^{-2}$ anions in a 1:1 weight ratio and the boron/nitrogen atom ratio is about 0.17. A portion of the mixture is ignited by injecting into it a small quantity of concentrated nitric acid. The mixture ignites readily and the blend burns more vigorously and more completely than solutions containing either component alone.

Solutions containing $B_3H_8^{-1}$ and $B_{12}H_{12}^{-2}$ anions in a hydrazine are operable in the process of the invention, in the manner described in Example 4, employing solutions in which the B/N ratio lies within the range described earlier.

In control tests conducted as described in Example 1, hydrazine alone ignites with concentrated nitric acid but does not continue to burn after the acid has been used up.

In further control tests a saturated solution of $(NH_2NH_3)_2B_{10}H_{10}$ in hydrazine ignites readily upon injection of concentrated nitric acid and burns with a sustained combustion which resembles closely the behavior of the solution of mixed $B_{10}H_{10}^{-2}$ and $B_{12}H_{12}^{-2}$ anions of Example 1. However, the impact sensitivity of this solution is not good as is evidenced below. In addition, a saturated solution of $NH_2NH_3B_{11}H_{14}$ or of $$(NH_2NH_3)_2B_{12}H_{12}$$

in hydrazine, when ignited at atmospheric temperature with concentrated nitric acid, does not burn with the desired smooth sustained combustion of the mixtures of Examples 1, 2, 3 and 4.

In a further test, a mixture consisting of 90 parts by volume of a saturated solution of $(NH_2NH_3)_2B_{12}H_{12}$ in hydrazine and 10 parts by volume of a saturated solution of $(NH_2NH_3)_2B_{10}H_{10}$ in hydrazine, is ignited by injection with concentrated nitric acid. The mixture ignites readily but combustion is not sustained satisfactorily and repeated injections of nitric acid are required.

The superior ignition properties of the compositions of the invention are further demonstrated in a second series of tests for which the data are summarized in Example 5. In this series of tests, the solutions are charged into a 9 mm. I.D. test tube and 98% fuming nitric acid is used as the igniter. The compositions of the solutions, shown in Example 5, are expressed as percent $B_{12}H_{12}^{-2}$/percent $B_{10}H_{10}^{-2}$ at a total salt concentration of 0.86 g./ml. of hydrazine.

Example 5

Composition (percent $B_{12}H_{12}^{-2}$/percent $B_{10}H_{10}^{-2}$):

| Composition | Ignitability |
|---|---|
| 100/0 (pure $B_{12}H_{12}^{-2}$) | Failed to ignite. |
| 90/10 | Failed to ignite. |
| 75/25 | Ignited easily—smoldered. |
| 50/50 | Ignited easily. |
| 25/75 | Ignited vigorously. |
| 0/100 (pure $B_{10}H_{10}^{-2}$) | Ignited vigorously. |

In Example 6 which follows, the superior properties of the compositions of the invention against breakdown by impact are demonstrated for solutions of the same total salt concentration as in Example 5. Impact sensitivity is estimated as follows:

A small sample (approximately 0.03 ml.) of the composition to be tested is enclosed in a cavity (approximately 0.06 ml.) formed in a steel cup, an elastic ring and a steel diaphragm. A piston rests on the diaphragm and carries a vent hole which is blocked by the steel diaphragm. A weight is dropped onto the piston. Explosion caused by the impact is indicated by puncture of the steel diaphragm accompanied by a loud noise. The sensitivity value for a given composition is the potential energy value (height x weight) at which the probability of explosion is 50%. Full details of this test are given in "Liquid Propellant Test Methods, Test No. 4, Drop-Weight Test," published by the Liquid Propellant Information Agency, Applied Physics Laboratory, The Johns Hopkins University, 8621 Georgia Avenue, Silver Spring, Maryland.

Example 6

| Composition (percent $B_{12}H_{12}^{-2}$/percent $B_{10}H_{10}^{-2}$): | Approximate impact sensitivity |
|---|---|
| 100/0 (pure $B_{12}H_{12}^{-2}$) | kg. cm. 120 |
| 75/25 | kg. cm. 90 |
| 50/50 | kg. cm. 114 |
| 25/75 | kg. cm. 15 |
| 0/100 (pure $B_{10}H_{10}^{-2}$) | kg. cm. 12 |

The data in Examples 1–6, inclusive, show that mixtures of $B_{12}H_{12}^{-2}$ anion with $B_{10}H_{10}^{-2}$ anion or $B_{11}H_{14}^{-1}$ anion possess a desirable and superior combination of properties with respect to ignitability and impact sensitivity. Compositions with this combination of properties are desirable for use in the field of high energy fuels, e.g., as monopropellants in liquid rocket propulsion motors. They can be used also in conjunction with oxidizing agents, e.g., nitrogen tetroxide, fluorine oxide, and the like, to provide fuels with high specific impulse and high heats of combustion.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A composition of mater comprising
   (A) a compound of the formula $$(RR'NNH_3)_2B_{12}H_{12-n}X_n$$

and (B) a compound selected from the class consisting of the formula $(RR'NNH_3)_aB_yH_z$ and $$(RR'NNH_3)_2B_{10}H_{10-n}X_n$$

wherein R and R' each is a group of the class consisting of hydrogen and lower alkyl, X is a monovalent group capable of bonding to carbon of a benzene nucleus by replacement of hydrogen bonded to said carbon, $n$ is a cardinal number of 0 through 3, inclusive, $a$ is equal to the valence of the $B_yH_z$ anion, and $y$ and $z$ each are different positive whole numbers of 1 through 20, inclusive; and wherein the weight of the $B_{12}$ compound is 25 to 90 percent of the total weight of boron-containing components, when calculated on the basis of the free acids.

2. A composition of claim 1 which contains, additionally, a hydrazine of the formula $RR'NNH_2$ wherein R and R' each is a group of the class consisting of hydrogen and lower alkyl.

3. A composition of claim 1 in which the ratio of atoms of boron to atoms of nitrogen is between 0.15 and 5.0, inclusive.

4. A composition of claim 1 in which the weight of the $B_{12}$ compound is 40 to 60 percent of the total weight of boron-containing components, when calculated on the basis of the free acids.

5. A composition of claim 1 in which the ratio of atoms of boron to atoms of nitrogen is between 0.4 and 1.0.

6. A composition of claim 1 in which the weight of the $B_{12}$ compound is 40 to 60 percent of the total weight of boron-containing components, when calculated on the basis of the free acids; and in which the ratio of atoms of boron to atoms of nitrogen is between 0.4 and 1.0.

7. A composition of matter comprising a compound of the formula $(RR'NNH_3)_2B_{12}H_{12}$ and a compound of the formula $(RR'NNH_3)_2B_{10}H_{10}$ wherein R and R' each is a group of the class consisting of hydrogen and lower alkyl, and wherein the weight of the $B_{12}$ compound is from 25 to 90 percent of the total weight of the boron-containing components, when calculated on the basis of the free acids.

8. A composition of claim 7 which contains, additionally, a hydrazine of the formula $RR'NNH_2$ wherein R and R' each is a group of the class consisting of hydrogen and lower alkyl.

9. A composition of claim 7 wherein the ratio of boron atoms to nitrogen atoms is between 0.15 and 5.0, inclusive.

10. A composition of claim 9 wherein R and R' are hydrogen.

11. A composition of claim 8 wherein the ratio of boron atoms to nitrogen atoms is between 0.15 and 5.0, inclusive.

12. A composition of claim 11 wherein R and R' are hydrogen.

13. A composition of matter comprising a compound of the formula $(RR'NNH_3)_2B_{12}H_{12}$ and a compound of the formula $RR'NNH_3B_{11}H_{14}$ wherein R and R' each is a group of the class consisting of hydrogen and lower alkyl; and wherein the weight of the $B_{12}$ compound is from 25 to 90 percent of the total weight of the boron-containing components, when calculated on the basis of the free acids.

14. A composition of claim 13 wherein the ratio of boron atoms to nitrogen atoms is between 0.15 and 5.0, inclusive.

15. A composition of claim 13 wherein R and R' are hydrogen.

16. A composition of claim 13 which contains, additionally, a hydrazine of the formula $RR'NNH_2$ wherein R and R' each is a group of the class consisting of hydrogen and lower alkyl.

17. A composition of claim 16 wherein the ratio of boron atoms to nitrogen atoms is between 0.15 and 5.0, inclusive.

18. A composition of claim 17 wherein R and R' are hydrogen.

No references cited.

CARL D. QUARFORTH, *Primary Examiner.*

UNITED STATES PATENT OFFICE
CERTIFICATE OF CORRECTION

Patent No. 3,219,499                      November 23, 1965

Boynton Graham

It is hereby certified that error appears in the above numbered patent requiring correction and that the said Letters Patent should read as corrected below.

Column 2, lines 2 and 4, for "X=C", each occurrence, read -- X-C --; column 12, line 67, for "mater" read -- matter --.

Signed and sealed this 11th day of October 1966.

(SEAL)
Attest:

ERNEST W. SWIDER                            EDWARD J. BRENNER
Attesting Officer                                    Commissioner of Patents

UNITED STATES PATENT OFFICE
CERTIFICATE OF CORRECTION

Patent No. 3,219,499            November 23, 1965

Boynton Graham

It is hereby certified that error appears in the above numbered patent requiring correction and that the said Letters Patent should read as corrected below.

Column 2, lines 2 and 4, for "X=C", each occurrence, read -- X-C --; column 12, line 67, for "mater" read -- matter --.

Signed and sealed this 11th day of October 1966.

(SEAL)
Attest:

ERNEST W. SWIDER
Attesting Officer

EDWARD J. BRENNER
Commissioner of Patents